United States Patent Office 3,174,821
Patented Mar. 23, 1965

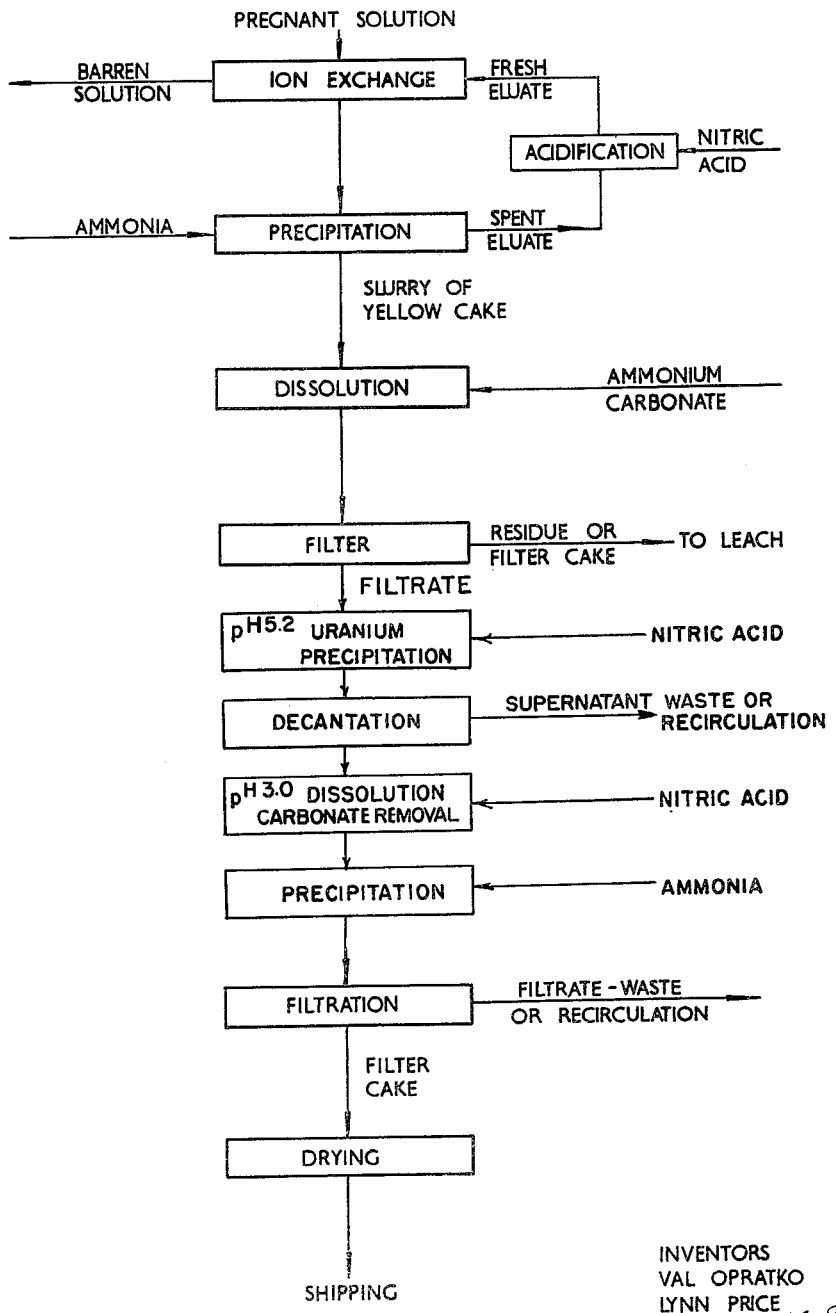

3,174,821
PURIFICATION OF YELLOW CAKE
Val Opratko, Elliot Lake, Ontario, and Lynn S. Price, Milliken, Elliot Lake, Ontario, Canada, assignors, by mesne assignments, to Rio Algom Mines Limited, Toronto, Ontario, Canada, a corporation of Canada
Filed Oct. 19, 1961, Ser. No. 146,118
10 Claims. (Cl. 23—14.5)

This invention relates to purification of uranium yellow cake and more particularly to a process for removing impurities, such as thorium, rare earths, iron, titania, silica, alumina, etc., contained in uranium yellow cake.

In the extraction of uranium from uranium bearing ores, usually by methods essentially comprising leaching of crushed uranium ore, subjecting the uranium solution to ion exchange purification or solvent extraction and precipitating the uranium, the product obtained, known in the art as "yellow cake," generally contains amounts of impurities, of the kind mentioned above, which render the yellow cake unsuitable for certain uses and thereby necessitating further refining or treatment. For example, refining of the yellow cake is required to reduce or remove objectionable amounts of impurities in order to produce nuclear grade material. Such refinements of the yellow cake are generally complex and inconvenient in that laborious techniques and expensive equipment are required.

An object of the present invention is to provide a relatively simple and inexpensive process for removing impurities contained in uranium yellow cake. The product produced by this process improves further purification treatments, if required, so that the uranium is suitable for specific uses such as for producing nuclear grade material.

Other objects will become apparent from a reading of the following description of the invention, the essence of which is the treatment of uranium yellow cake with a carbonic acid salt to form a uranium carbonate complex in an aqueous solution from which the insoluble impurities may be removed by simple well known separation methods.

In accordance with the invention, any carbonic acid salt capable of forming a water-soluble uranium carbonate complex may be used. Although carbonates and bicarbonates of potassium, sodium or ammonium, either singly or in admixture, are preferred examples of suitable salts, the salt and the amount thereof to be used depends principally on the desired product. For instance, ammonium carbonate is very effective since the ammonia, in the ammonium diuranate obtained as hereinafter described, can be burnt off, thereby increasing the uranium content of the product. On the other hand, the use of calcium will require special treatment to prevent any deleterious effect owing to its presence in the uranium precipitate which may be obtained by the process.

Following the separation of the insoluble impurities, the uranium carbonate complex solution is treated to recover the uranium, usually as diuranate. The recovery may be accomplished by acidifying the uranium carbonate complex solution thereby evolving $CO_2$ and precipitating and filtering the diuranate.

The following reaction scheme in conjunction with the appended flowsheet illustrates the process of our invention using ammonium carbonate and bicarbonate.

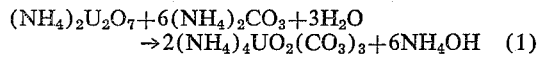

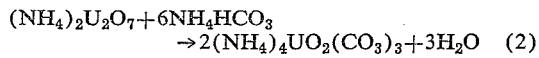

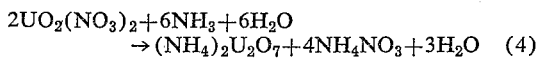

Referring to the flowsheet, the slurry of yellow cake is obtained by a known method which will be readily recognized by those skilled in the art and which does not form part of this invention. The steps leading up to the production of the yellow cake are included to show that the process of the invention may be carried out, either continuously or batchwise, as part of the refinement of a uranium bearing ore, to obtain a product having substantially less impurities than obtainable heretofore.

It will be seen that the pregnant solution from the leaching is subjected to ion exchange (or solvent extraction) to produce a high grade eluate from which the yellow cake is precipitated using ammonia. At this stage, the uranium in the slurry of ammonium diuranate is present on a solid basis in an amount usually greater than 70% by weight expressed as $U_3O_8$.

The ammonium diuranate is dissolved in ammonium carbonate or bicarbonate at e.g. a pH of about 7.4 to 8.8 according to reactions (1) and (2). The time required for dissolution varies with the temperature, the dissolution requiring 2–4 hours at 70–80° C. but requiring a greater time at lower temperatures.

The insoluble impurities, such as thorium, rare earths, iron, titania, silica, alumina and many others, to be hereinafter discussed, are removed upon clarification of the uranium complex solution. It is pointed out that the efficiency of the clarification affects the purity of the final product. Furthermore, at this stage, the impurities removed, usually in the form of a cake, could be treated to recover the thorium, rare earths, etc., or they could be recirculated to the pregnant solution or to the leaching step of the refinement.

After removal of the insoluble impurities the uranium tricarbonate complex solution is treated with nitric acid according to reaction (3) to a pH of usually, less than 5.2 depending upon the amount of carbonate present. Other acids, such as sulphuric or hydrochloric, are also employable in the process. The carbon dioxide evolved on acidification is removed.

The acid treatment of the complex solution may be carried out in a multi-stage operation exemplified by the following steps:

(1) Adding nitric acid to the complex solution until the pH is about 5.2,
(2) Decanting the supernatant liquor after several hours of settling, and
(3) Adding nitric acid to dissolve the precipitated diuranate, i.e. until a pH of about 3.0.

The uranium from the single- or multistage acid treatment is then precipitated as ammonium diuranate by reaction with ammonia as shown in reaction (4). Sodium hydroxide or magnesium oxide are examples of other precipitating reagents which may be used instead of ammonia. After filtration, the ammonium diuranate may be dried and shipped to plants where it may undergo further refinement in preparation for specific uses.

The foregoing carbonate treatment of yellow cake yields a product containing a substantially increased amount of uranium, usually greater than 83% $U_3O_8$ on a solid basis depending upon the yellow cake feed. The content of thorium, iron, titanium, aluminium and silicon in the product is generally reduced to below 100 p.p.m. (parts per million) while the rare earths are believed to be below 80 p.p.m. based on spectrographic analysis. Moreover, there is a good indication that the boron content is substantially reduced. Sulphate, phosphate, calcium, magnesium, lead, manganese, copper and vanadium are also partly removed.

The efficacy of the process for removing impurities is illustrated by analyses of typical samples taken from a laboratory scale operation and a plant scale operation which are reported in Table I and II below. Unless otherwise indicated, the amounts are expressed in percent by weight.

TABLE I

*Analytical results of carbonate treatment on laboratory scale*

| Elements | Yellow Cake Feed | Product |
|---|---|---|
| $U_3O_8$ | 81.40 | 84 |
| Th | .98 | <.01 |
| Fe | .54 | <.01 |
| $Al_2O_3$ | .89 | <.01 |
| $TiO_2$ | .45 | <.01 |
| $SiO_2$ | .40 | <.01 |
| F | .020 | .020 |
| $PO_4$ | .26 | .044 |
| Ca | .10 | .04 |
| $SO_4$ | 3.58 | .69 |
| B | | |
| Cu | .002 | .001 |
| Mg | .02 | .01 |
| Mn | .005 | .002 |
| Pb | .3 | .007 |
| V | .007 | .005 |
| Dy p.p.m. | 42 | 1.2 |
| Eu p.p.m. | 3 | <.10 |
| Gd p.p.m. | 41 | .75 |
| Sm p.p.m. | 24 | 6.5 |
| Y p.p.m. | 140 | 2.5 |

TABLE II

*Analytical results of carbonate treatment on plant scale*

| Elements | Yellow Cake Feed | Product |
|---|---|---|
| $U_3O_8$ | 79.69 | 86.09 |
| Th | .75 | .0063 |
| $(RE)_2O_3$* p.p.m. | 216 | 78 |
| Fe | .28 | .020 |
| $TiO_2$ | .14 | .0028 |
| $Al_2O_3$ | .45 | .0249 |
| $SiO_2$ | .30 | .041 |
| $SO_4$ | 4.00 | 1.45 |
| $NH_3$ | 2.94 | 2.19 |
| $PO_4$ | .18 | .013 |
| $CO_3$ | .07 | .04 |
| Ca | .10 | .01 |
| F | .018 | .011 |
| B p.p.m. | 10 | 4 |
| Cu p.p.m. | 56 | .23 |
| As | .014 | .005 |
| Pb | .27 | .018 |
| $H_2O$ | | |

*Content of four rare earths present in the product is Dy 6.4 p.p.m.; Eu 1.2 p.p.m.; Gd 9.5 p.p.m.; Sm 10.5 p.p.m.

It will be seen from the tables, that in both cases, the level of impurities is substantially reduced. The approximate amount of rare earths based on spectographic analysis, was reduced from 250 to 11 p.p.m. and 216 to 78 p.p.m for the laboratory and plant operations respectively, so that a high degree of reduction was accomplished. In the case of thorium, iron, titanium oxide, alumina and silica, it will be noted that these impurities were substantially eliminated. There was also an indication that the cadmium substituent in the yellow cake, which is not shown in the tables, is effectively reduced.

In addition to the general reduction of objectionable impurities in yellow cake, the process of the present invention may be advantageously modified so that any troublesome or critical impurity, which is not removed by the carbonate treatment, and which is susceptible to precipitation by reaction with a specific reagent, could be removed prior to clarification.

Another advantage of the process of this invention is that the uranium carbonate complex may be loaded on anion exchange resins commonly in use prior to this invention. Furthermore, carbonates, particularly ammonium, potassium, or sodium, are relatively inexpensive thereby making this process economically attractive.

It is to be understood that we intend to claim in the appended claims all variations, substitutions and changes that lie within the scope of this invention.

What we claim as new and desire to protect by Letters Patent of the United States is:

1. A process for removing impurities in uranium yellow cake containing predominant amounts of ammonium diuranate comprising the steps:
   (a) treating the yellow cake with an aqueous solution of a carbonic acid salt to form a soluble uranium carbonate complex;
   (b) separating the insoluble impurities;
   (c) acidifying the uranium carbonate complex solution to a pH of about 5.2 whereby a diuranate is precipitated and carbon dioxide is released;
   (d) decanting the supernatant liquor;
   (e) acidifying the precipitate to a pH of about 3.0 whereby the precipitate is redissolved; and
   (f) treating the thus formed solution with a precipitating reagent whereby a substantially pure diuranate is recovered.

2. A process according to claim 1, wherein the precipitating reagent of step (f) is ammonia.

3. A process according to claim 1 wherein the acidifying of steps (c) and (e) is effected by nitric acid.

4. A process for removing impurities in uranium yellow cake containing predominant amounts of ammonium diuranate comprising the steps:
   (a) treating the yellow cake with an aqueous solution of a carbonic acid salt to form a soluble uranium carbonate complex;
   (b) separating insoluble impurities;
   (c) acidifying the uranium carbonate complex solution to a pH of about 5.2 whereby a diuranate is precipitated and carbon dioxide is released;
   (d) acidifying the precipitate to a pH of about 3.0 whereby the precipitate is redissolved, and
   (e) treating the thus formed solution with a precipitating agent whereby a substantially pure diuranate is recovered.

5. A process according to claim 4 in which the carbonic acid salt of step (a) is selected from the group consisting of carbonates and bicarbonates of sodium, potassium and ammonium.

6. A process according to claim 4 wherein the acidifying of steps (c) and (d) is effected by an acid selected from the group consisting of nitric, sulphuric and hydrochloric acids.

7. A process according to claim 4 wherein the precipitating reagent of step (f) is selected from the group consisting of ammonia, magnesium oxide and sodium hydroxide.

8. A process according to claim 4 in which the yellow cake is treated with sufficient carbonic acid salt to dissolve more than 90% $U_3O_8$.

9. A process according to claim 5 wherein the treatment with the carbonic acid salt is affected at a pH between about 7.4 to about 9.

10. A process for removing impurities in uranium yellow cake containing predominant amounts of ammonium diuranate comprising the steps:
   (a) treating the yellow cake with an aqueous solution of a carbonic acid salt selected from the group consisting of ammonium carbonate and ammonium bicarbonate to form a soluble uranium carbonate complex;
   (b) separating the insoluble impurities;
   (c) acidifying the uranium carbonate complex solution with nitric acid to a pH of about 5.2 whereby a diuranate is precipitated and carbon dioxide is released;
   (d) acidifying the precipitate to a pH of about 3.0 whereby the precipitate is redissolved; and
   (e) treating the thus formed solution with ammonia whereby a substantially pure diuranate is recovered.

References Cited by the Examiner
UNITED STATES PATENTS

| | | | |
|---|---|---|---|
| 2,703,271 | 3/55 | Shea et al. | 23—14.5 |
| 2,750,253 | 6/56 | Smith | 23—14.5 |
| 2,830,871 | 4/58 | Kaufman | 23—14.5 |
| 2,873,165 | 2/59 | Bailes et al. | 23—14.5 |
| 2,885,270 | 5/59 | Karcher et al. | 23—14.5 |
| 2,950,951 | 8/60 | Sherk | 23—14.5 |
| 3,000,698 | 9/61 | Crowe | 23—14.5 |

FOREIGN PATENTS 844,407   8/60   Great Britain.

OTHER REFERENCES

Clegg et al.: "Uranium Ore Processing," pp. 149, 164, 339 (1958), Addison-Wesley Publishing Co., Inc.

Butter: "Engineering and Mining Journal," vol. 152 No. 13, pp. 56 and 62, March 1951.

CARL D. QUARFORTH, *Primary Examiner.*